US005668864A

United States Patent [19]

Kageyama

[11] Patent Number: 5,668,864
[45] Date of Patent: Sep. 16, 1997

[54] DATA COMMUNICATION METHOD AND APPARATUS INCLUDING VOLATILE AND NON-VOLATILE STORAGE

[75] Inventor: Mitsuhiro Kageyama, Urawa, Japan

[73] Assignee: Canon Kabushiki Kaisha, Tokyo, Japan

[21] Appl. No.: 721,944

[22] Filed: Sep. 27, 1996

Related U.S. Application Data

[62] Division of Ser. No. 614,262, Mar. 12, 1996, Pat. No. 5,590,190, which is a continuation of Ser. No. 400,388, Mar. 3, 1995, abandoned, which is a continuation of Ser. No. 76,928, Jun. 16, 1993, abandoned, which is a continuation of Ser. No. 604,166, Oct. 29, 1990, abandoned.

[30] Foreign Application Priority Data

Oct. 31, 1989 [JP] Japan ........................ 1-281818
Oct. 31, 1989 [JP] Japan ........................ 1-281820

[51] Int. Cl.⁶ .................................... H04M 1/27
[52] U.S. Cl. .................. 379/356; 379/355; 379/357; 379/100.01
[58] Field of Search ........................ 379/355, 356, 379/357, 96, 400, 403, 434, 100

[56] References Cited

U.S. PATENT DOCUMENTS

| | | | |
|---|---|---|---|
| 4,587,633 | 5/1986 | Wang et al. | 379/100 |
| 4,622,582 | 11/1986 | Yamada | 358/438 |
| 4,646,160 | 2/1987 | Iizuka et al. | 379/355 |
| 4,688,100 | 8/1987 | Haganuma et al. | 358/261 |
| 4,759,056 | 7/1988 | Akiyama | 379/357 |
| 4,800,582 | 1/1989 | D'Agosto, III et al. | 379/355 |
| 4,827,349 | 5/1989 | Ogata et al. | 358/256 |
| 4,829,385 | 5/1989 | Takezawa | 358/260 |
| 4,907,094 | 3/1990 | Mishima et al. | 358/437 |
| 4,910,785 | 3/1990 | Nakatsuma | 382/9 |
| 4,914,691 | 4/1990 | Berger | 379/357 |
| 4,922,349 | 5/1990 | Abe et al. | 358/443 |
| 4,975,786 | 12/1990 | Katayama et al. | 358/459 |
| 5,086,434 | 2/1992 | Abe et al. | 357/7 |
| 5,258,998 | 11/1993 | Koide | 375/7 |

FOREIGN PATENT DOCUMENTS

| | | |
|---|---|---|
| 3420331 | 2/1985 | Germany . |
| 0224964 | 12/1984 | Japan . |
| 0221068 | 12/1984 | Japan . |
| 0299629 | 12/1988 | Japan . |
| 0058147 | 3/1989 | Japan . |

*Primary Examiner*—Harry S. Hong
*Assistant Examiner*—Jacques M. Saint-Surin
*Attorney, Agent, or Firm*—Fitzpatrick, Cella, Harper & Scinto

[57] ABSTRACT

In a data communication apparatus having an abbreviated dialing function, data referred to when performing abbreviated dialing is prevented from vanishing in the event of a malfunction or power failure. This is achieved by providing the apparatus with an internal non-volatile storage device in addition to a memory which stores information referred to when communicating with another party. The information which has been stored in the memory is preserved in the non-volatile storage device. If the information in the memory vanishes, the preserved information is restored by being loaded into the memory from the non-volatile storage device.

66 Claims, 7 Drawing Sheets

DATA COMMUNICATION METHOD AND APPARATUS INCLUDING VOLATILE AND NON-VOLATILE STORAGE

This application is a division of application Ser. No. 08/614,262 filed Mar. 12, 1996, now U.S. Pat. No. 5,590,190, which is a continuation of application Ser. No. 08/400,388, filed Mar. 3, 1995, now abandoned, which is a continuation of application Ser. No. 08/076,928, filed Jun. 16, 1993, now abandoned, which was a continuation of application. Ser. No. 07/604,166, filed Oct. 29, 1990, now abandoned.

BACKGROUND OF THE INVENTION

This invention relates to a data communication apparatus and, more particularly, to a data communication apparatus as typified by a facsimile apparatus for sending and receiving images.

In many recent facsimile machines, the telephone numbers of facsimile machines belonging to other parties with which communication is frequent are registered beforehand in a memory backed up by the machine itself. Accordingly, rather than entering a telephone number when a transmission is to be made, the machine of the other party is called merely by pressing a minimal number of keys, which is followed by transfer processing.

In a case where data such as the telephone numbers of other parties are thus preserved in a back-up memory, usually a protective circuit of some kind is provided to protect the internally stored data. Ordinarily, a back-up memory requires not only processing for registering data but also a circuit which forbids the output of a memory-write signal.

A problem encountered in the prior art is that when a failure or malfunction develops in the circuitry including the back-up memory, the content of the back-up memory is lost when replacing circuit components or removing the battery in order to check the circuit.

SUMMARY OF THE INVENTION

A first object of the present invention is to provide a data communication apparatus which makes it possible to avoid a situation wherein information, which is referred to when communicating with a terminal of another party, cannot be restored because of a malfunction or power failure.

According to the present invention, the foregoing object is attained by providing a data communication apparatus comprising a memory for storing information referred to when communicating with a terminal of another party, preserving means for preserving the information, which has been stored in the memory, in a non-volatile storage device, and reading means for reading the information, which has been preserved by the preserving means, out to the memory.

A second object of the present invention is to provide a data communication apparatus in which, even if information referred to when communicating with a terminal of another party vanishes because of a malfunction or power failure, the information can be restored through a simple operation.

According to the present invention, the second object is attained by providing a data communication apparatus which performs data communication with a terminal of another party via a line, comprising a memory for storing information referred to when communicating with the terminal of the other party, a non-volatile memory storage device, first designating means for designating that the information stored in the memory is to be saved, preserving means for preserving the information, which has been stored in the memory, in the non-volatile storage device when a preservation designation is made by the first designating means, second designating means for designating that the information, which has been stored in the memory, is to be restored, and reading means for reading the information, which has been stored in the non-volatile storage device, out to the memory when a restoration designation is made by the second designating means.

A third object of the present invention is to provide a data communication apparatus in which, even if information referred to when communicating with a terminal of another party vanishes because of a malfunction or power failure, the information can be restored merely by re-introducing power from a power supply.

According to the present invention, the third object is attained by providing a data communication apparatus which performs data communication with a terminal of another party via a line, comprising a memory for storing information referred to when communicating with the terminal of the other party, a non-volatile memory storage device, designating means for designating that the information stored in the memory is to be saved, preserving means for preserving the information, which has been stored in the memory, in the non-volatile storage device when a preservation designation is made by the designating means, and reading means for reading the information, which has been preserved by the preserving means, out to the memory when electric power is introduced to the reading means itself.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Embodiments of the present invention will now be described in detail with reference to the accompanying drawings.

Figure 1:
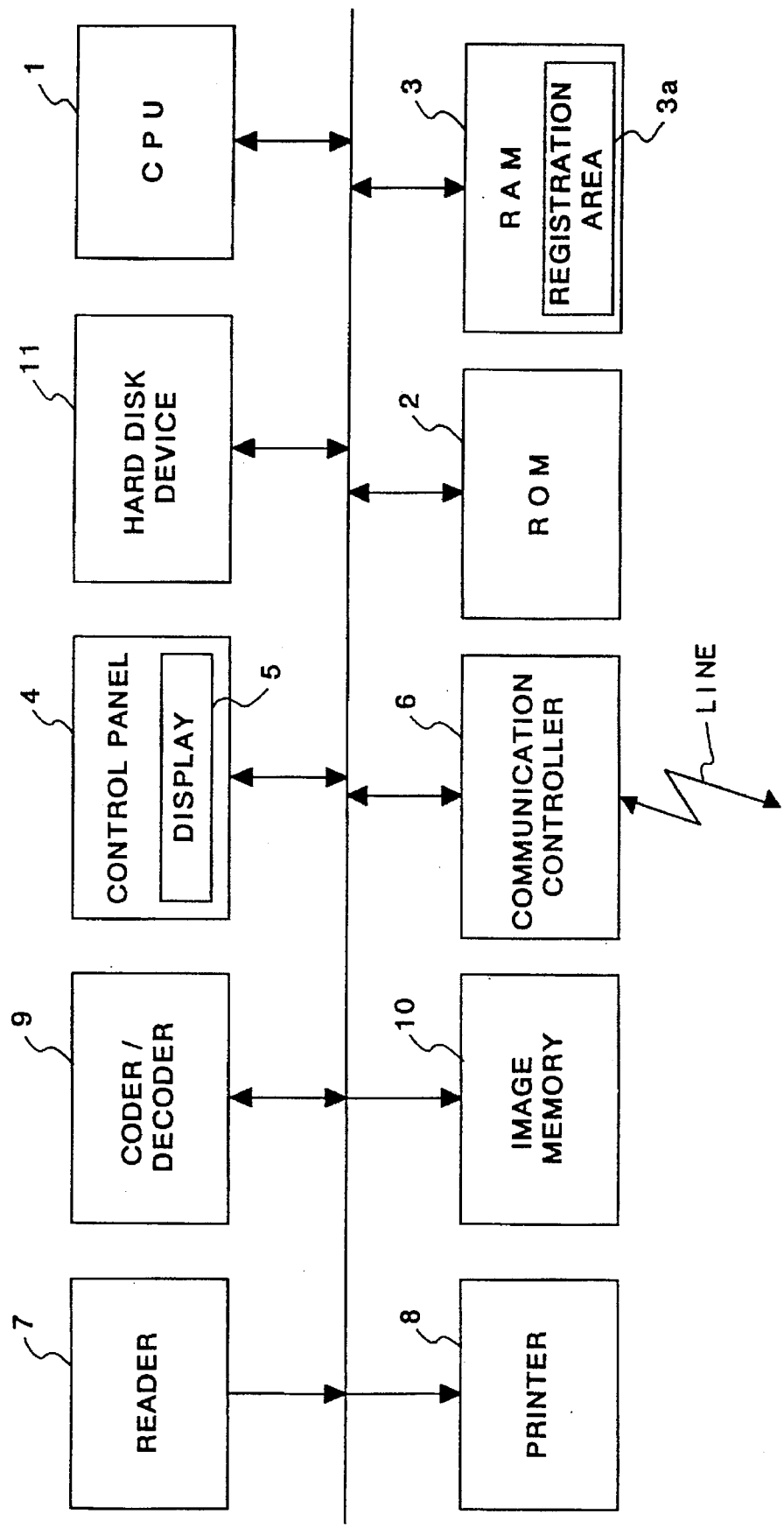
FIG. 1 is a block diagram showing a facsimile machine embodying the present invention.
Figure 2:
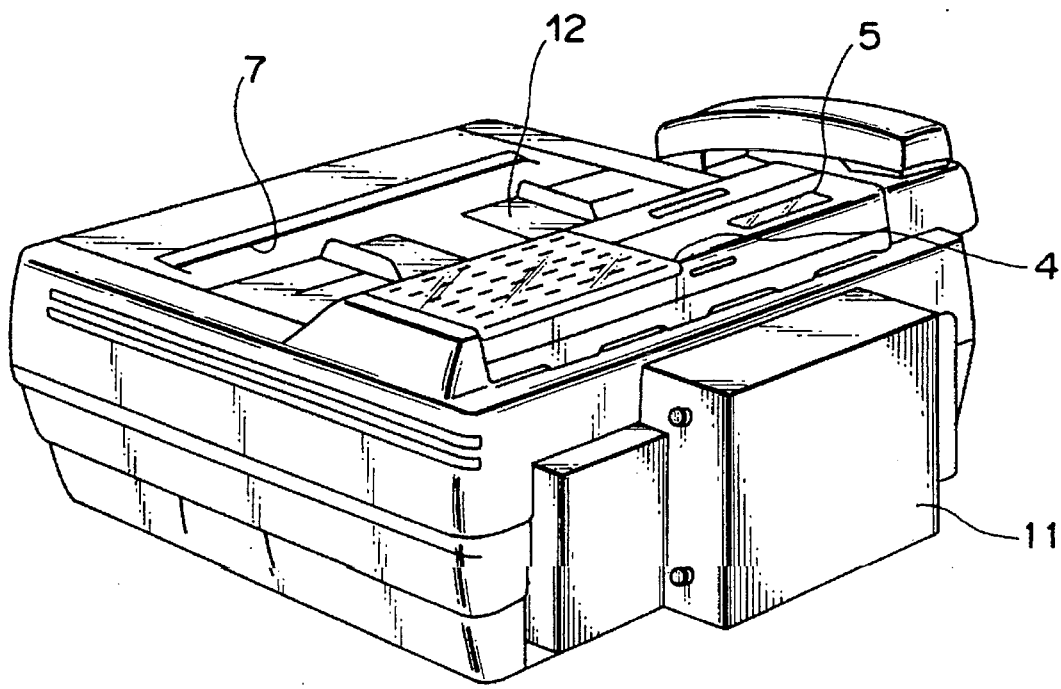
FIG. 2 is a perspective view showing the back of the facsimile machine embodying the present invention.

FIG. 1 is a block diagram showing a facsimile machine embodying the present invention, and FIG. 2 is a perspective view showing the back of this facsimile machine.

The facsimile machine includes a CPU 1 for administering overall control of the apparatus, a ROM 2 which stores a program for communication-related processing executed by the CPU 1, as well as a program, illustrated by the flowchart of FIG. 6, described below, also executed by the CPU 1, and a RAM 3 having a registration area 3a which is used as the working area of the CPU 1 and stores registered telephone numbers of other parties, the abbreviated names of other parties, the abbreviated name of the user, the telephone number of the user's machine, and memory switches for selecting the functions of the machine. Also included are a control panel 4 having a group of keys for performing various operations, and a display section (comprising a liquid-crystal panel or the like) 5 for displaying various messages and the like, a communication controller 6 for controlling the connection between the machine and a line, and through which data are sent and received, a reader 7 for reading an original image, a printer 8 for visibly recording a received image, a coder/decoder 9 for coding image data read by the reader 7 and decoding data received via the communication controller 6, an image memory 10 for storing received data and data read by the reader 7, and a hard disk device 11 having a large capacity in comparison with that of the image memory 10. The hard disk device 11 can be simply loaded and unloaded and therefore a portion of the case thereof is mounted on the facsimile machine body so as to project from the back side thereof. Besides being used for the purposes described below, the hard disk device 11 can also be used to preserve a received image to provide a substitute for recording on paper, and to transmit an image. In case of transmission, data are compressed whenever one page of the original is read, the compressed data are preserved on the hard disk device 11, and transmission processing is executed when preservation of the last page ends. This makes it possible to transmit a large quantity of data at one time. This is advantageous in terms of reducing cost since it is expensive to perform the same processing solely by means of an IC chip. Numeral 12 denotes a platen on which an original to be transmitted is placed.

Figure 3:
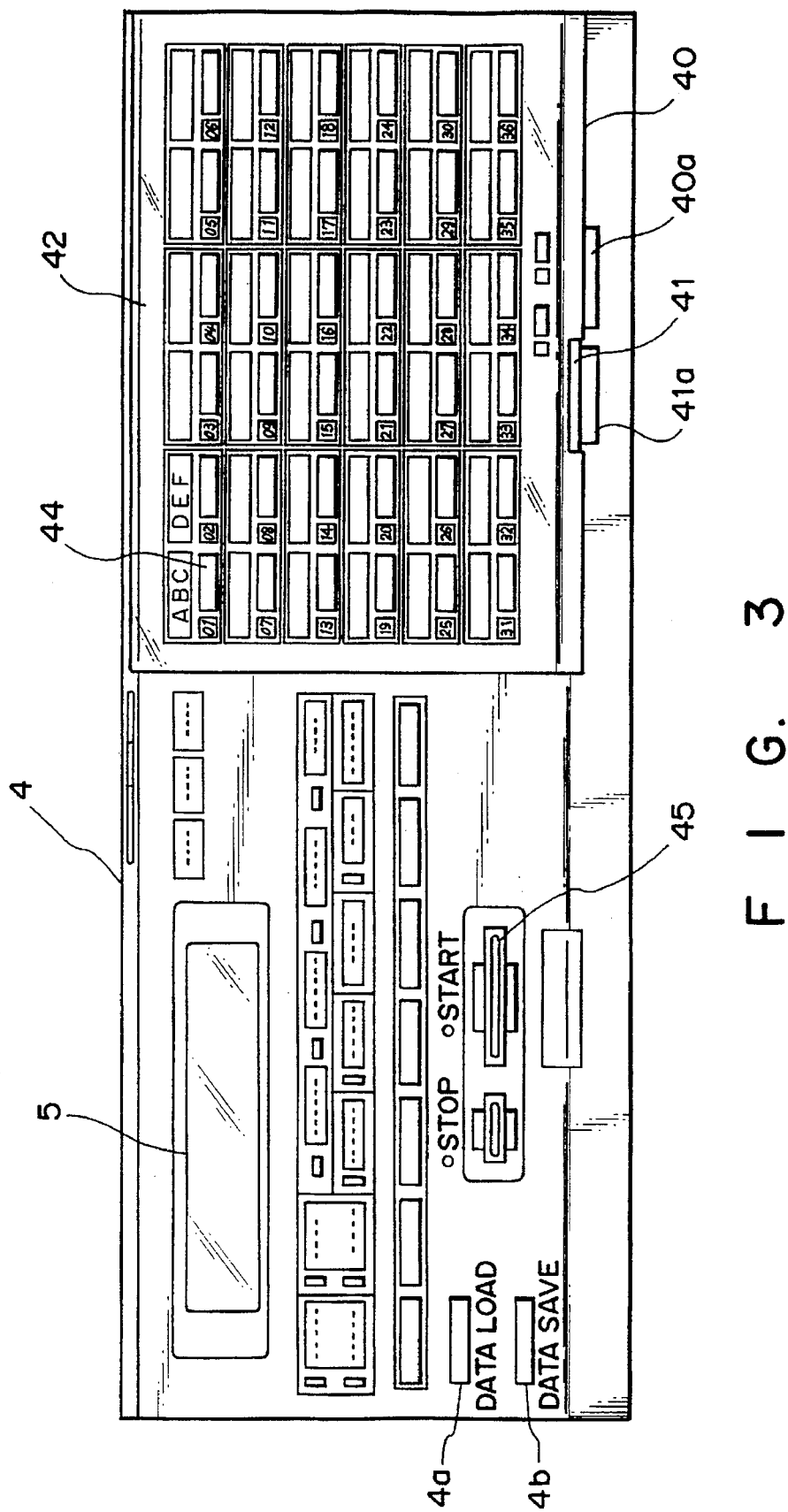
FIG. 3 is a diagram showing a control panel of the embodiment as seen from above.

A top view of the control panel 4 of this embodiment is illustrated in FIG. 3.

The control panel 4 of this embodiment is provided with keys for performing various operations. These keys include a data load key 4a and a data save key 4b.

Figure 4A:
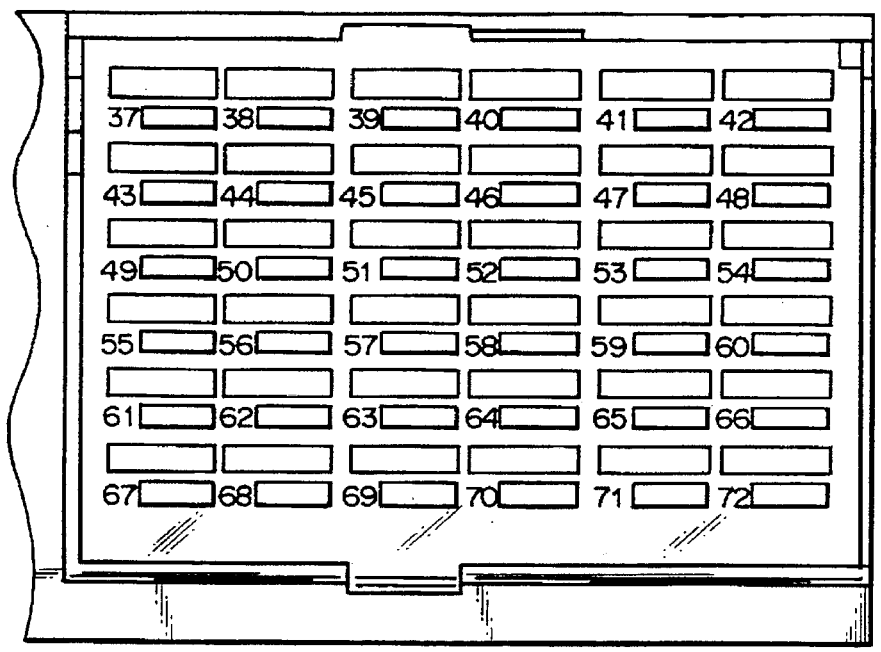
FIGS. 4A and 4B are diagrams showing single-touch dial panels when turned over as in the manner of the pages of a book.
Figure 4B:
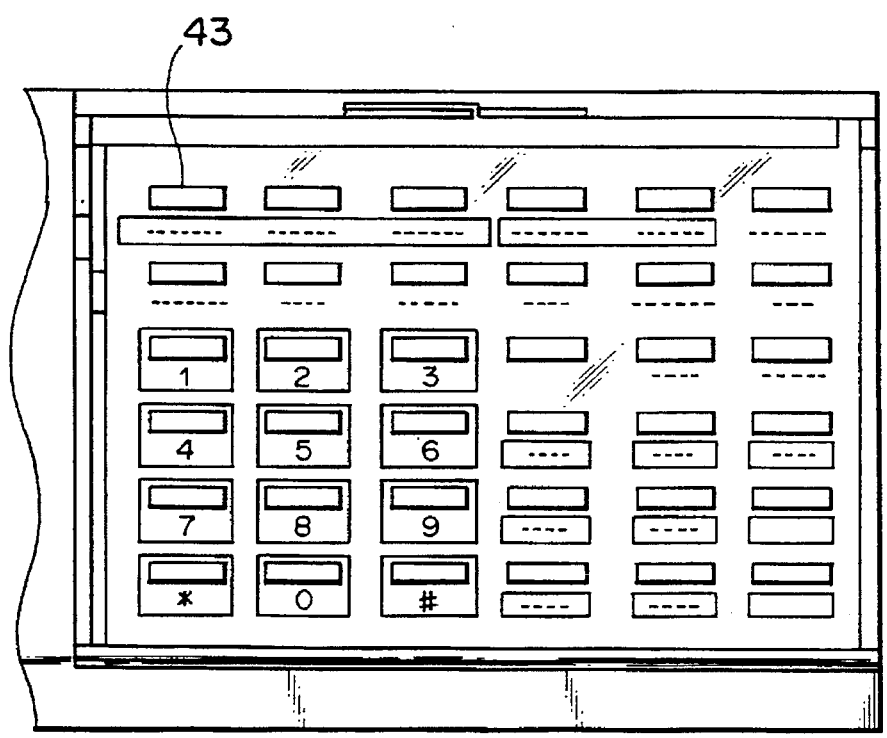

The right half of the control panel 4 has single-touch dial panels 40, 41 superimposed as shown in the drawings. The single-touch dial panels 40, 41 have appropriately located openings penetrated by the keys provided the control panel of the machine. The dial panels 40, 41 are capable of being flipped open on a hinge indicated at numeral 41 in FIG. 3. FIG. 4A shows the single-touch dial panel 40 opened by grasping a tab 40a possessed by this panel, and FIG. 4B shows the single-touch dial panel 41 opened by grasping a tab 41a possessed by this panel. Which single-touch dial panel is closed at the present time is detected by employing a well-known technique. The meanings of the keys differs depending upon which of the single-touch dial panels is closed.

Figure 5:
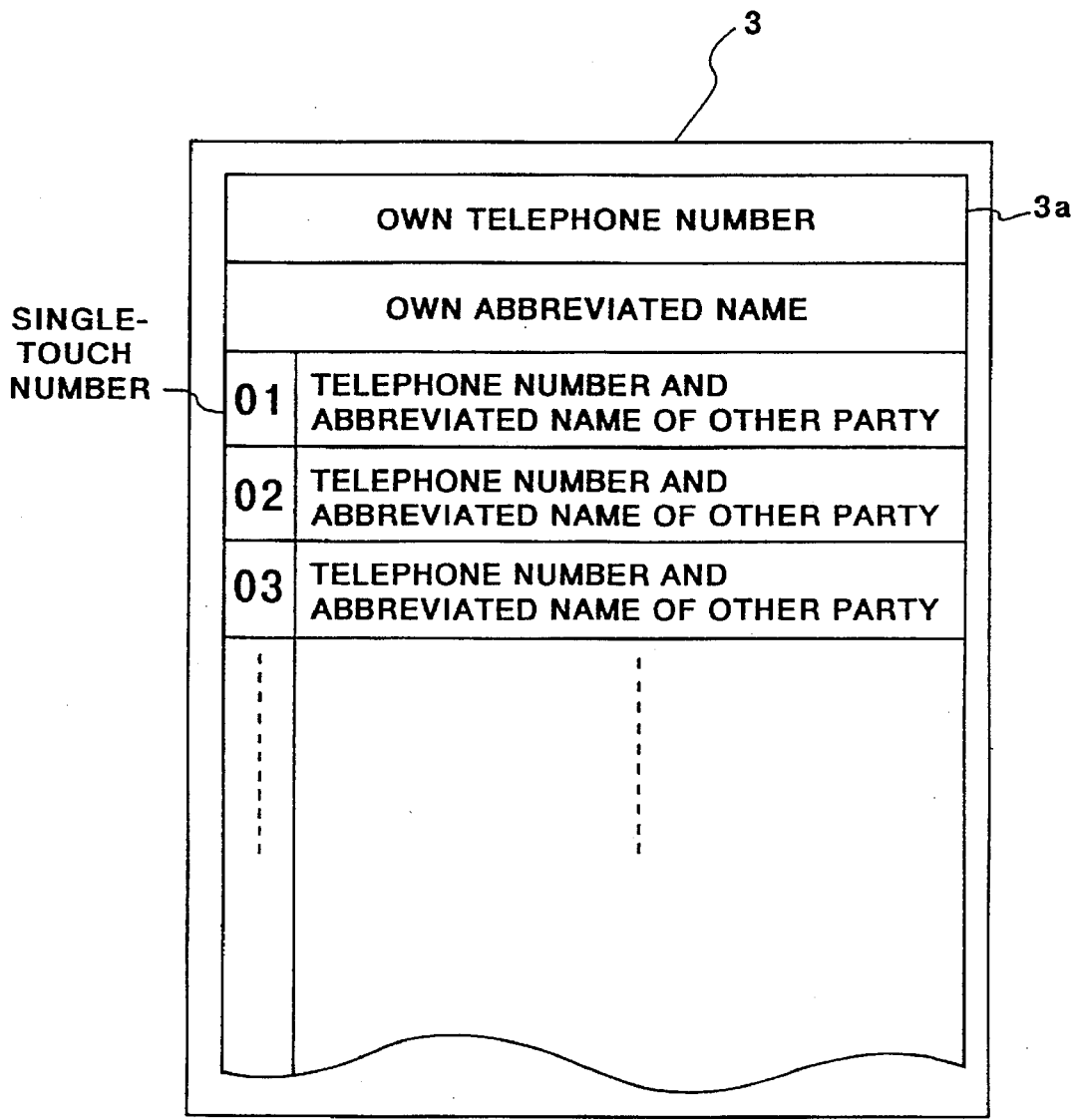
FIG. 5 is a diagram showing the contents of a registration area in the embodiment.

In a case where a party to be the destination of a transmission is registered anew, a "TEL. REGISTRATION" key 43 (FIG. 4B) is pressed to so inform the CPU 1. Thereafter, in accordance with messages displayed in response to commands from the CPU 1, the number of the single-touch key, the other party's telephone number and the other party's abbreviated name are entered. The data thus registered are stored in the registration area 3a of the RAM 3. The contents of the registration area 3a are as shown in FIG. 5. Specifically, the user's own telephone number and abbreviated name are stored, followed by each single-touch number and the corresponding other party's telephone number and abbreviated that have been registered. For example, if the "01" key (numeral 44 in FIG. 3) among the single-touch keys is pressed to perform a transmission, the corresponding telephone number of the other party is searched from the table shown in FIG. 5, and an original image read in by the reader 7 is transmitted to party "ABC". Since transmission processing is executed in accordance with a well-known procedure, such processing need not be described here.

The principal operation of the apparatus constructed as set forth above will now be described.

As described earlier, a plurality of telephone numbers of other parties are capable of being stored in registration area 3a. However, in the event of an expected apparatus malfunction or power failure, the data registered in the registration area 3a will vanish.

Accordingly, in the present embodiment, the control panel 4 is provided with the data save key 4b for saving the data contained in the registration area 3a. When the data save key 4b is pressed, processing is executed in such a manner that the data registered in the registration area 3a of the RAM 3 are written at a predetermined location (or at a predetermined file name) of the hard disk device 11, which serves as a non-volatile memory.

Thus, even if the data previously registered in the registration area 3a should happen to vanish because of an unexpected occurrence, the arrangement described above assures that the same data will be preserved on the hard disk device 11. This constitutes a safety feature.

In a case where the registered data preserved on the hard disk device 11 are to be read out to the registration area 3a again, this can be achieved by pressing the load key 4a, which loads the registered data, provided on the control panel 4.

Figure 6:
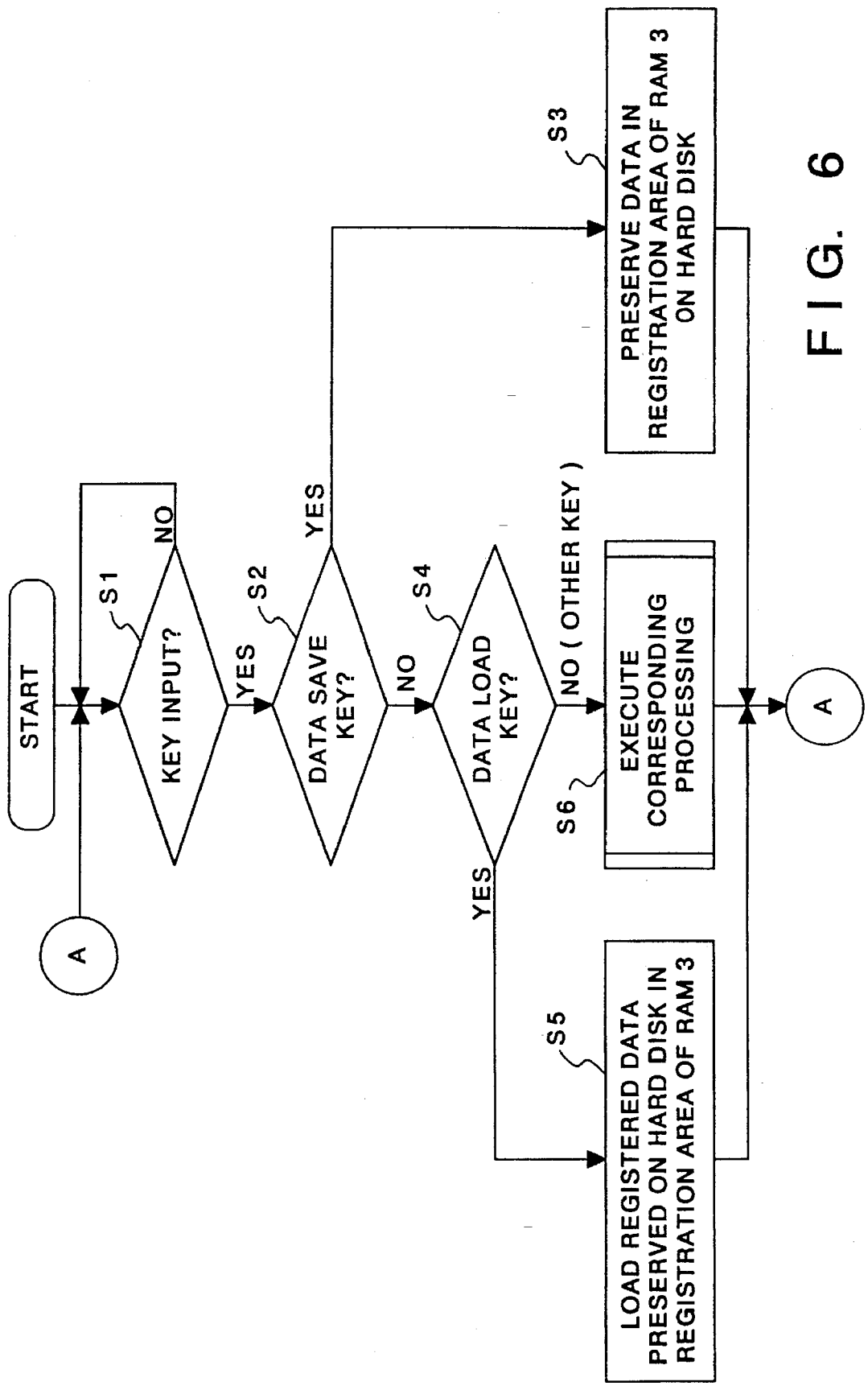
FIG. 6 is a flowchart illustrating the details of processing performed by the facsimile machine of the embodiment.

The flowchart of FIG. 6 illustrates the operations performed by the CPU 1 in accordance with the processing described above.

An input from one of the keys on the control panel 4 is awaited at step S1 of the flowchart. When a key input (depression of a key) is detected, the program proceeds to step S2, at which it is determined whether the pressed key is the data save key 4b. If the data save key 4b is pressed, the program proceeds to step S3, where all of the data registered in the registration area 3a of RAM 3 are preserved on the hard disk device 11, after which the program returns to step S1.

If it is determined at step S2 that the pressed key is a key other than the data save key 4b, then the program proceeds to step S4, at which it is determined whether the pressed key is the data load key 4a. If it is determined that the data load key 4a has been pressed, the program proceeds to step S5, at which the registered data preserved on the hard disk device 11 is loaded in the registration area 3a of the RAM 3.

If it is determined at step S4 that the pressed key is a key other than the data load key 4b, then the program proceeds to step S6, at which processing corresponding to the pressed key, such as processing for transmitting the image of the original or processing for registering the telephone number of another party, is executed.

It is assumed here that data reception and print-out are performed through interrupt processing if an incoming call arrives during the foregoing processing. In a case where recording paper (a paper roll) is detected by a sensor (not shown) during print-out, the received image is successively preserved on the hard disk device 11. To print out the preserved image, first a new sheet of recording paper is set inside the apparatus and a start key 45 is pressed.

In accordance with the first embodiment described above, the registered data such as the telephone numbers of other parties are preserved in a non-volatile storage device such as the hard disk device 11, and the data can be loaded in the RAM if required. Since the data are preserved in this manner, the data cannot vanish.

More specifically, if the apparatus malfunctions, the prior art is such that processing for registering the telephone numbers of other parties must be performed again after the apparatus is repaired. However, with the facsimile machine of the first embodiment, the operation for re-registering the data either is unnecessary or is capable of being performed in a shorter period of time.

In the first embodiment described above, the special-purpose key 4a or 4b is pressed when the data stored in the registration area 3a of the RAM 3 are preserved on the hard disk device 11 or, conversely, when these data are loaded. However, these special-purpose keys for executing this processing are not absolutely required. As an alternative, a single specific function key can be provided and it can be so arranged that the relevant processing is designated in accordance with a message displayed on the display section 5 after this key is pressed, or so that the relevant processing is selected from a displayed menu after the key is pressed.

In a case where power to the apparatus is lost because of a power failure or the like, it is possible to restore the data, which were stored in the registration area 3a prior to the power failure, by pressing the data load key 4a after power has been re-introduced. However, it is possible to adopt an arrangement in which the data are restored automatically, particularly in this case, without the user performing any operation. More specifically, it is possible to add a processing step, which is for writing the particular data from the hard disk device 11 to the registration area 3a, ahead of step 1 in FIG. 6, which is the step for determining whether there is a key input or an incoming call.

Figure 7:
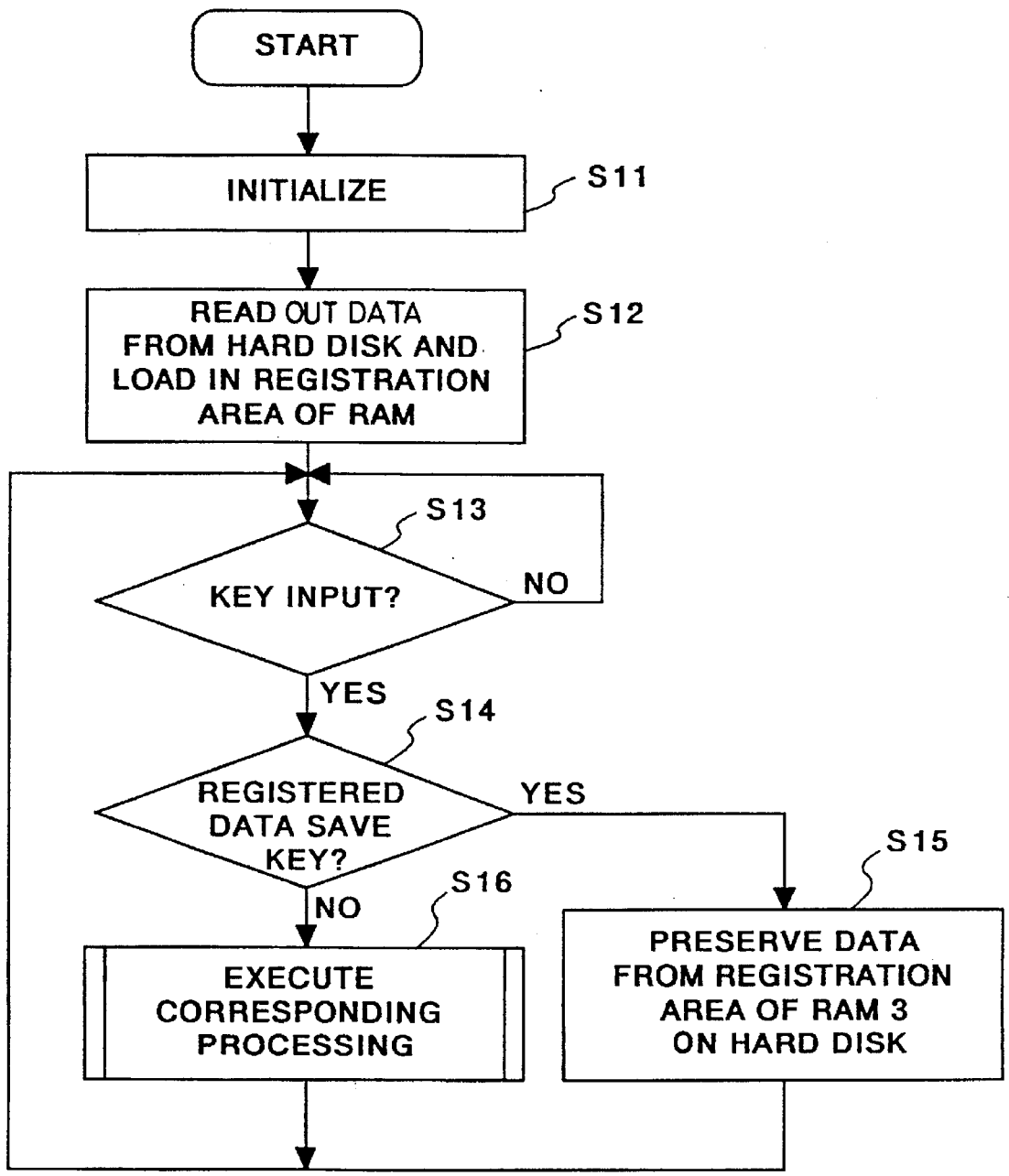
FIG. 7 is a flowchart illustrating the details of processing performed by a facsimile machine of another embodiment.

The processing procedure of a second embodiment of the invention will now be described in accordance with the flowchart of FIG. 7. In order to practice the second embodiment, it goes without saying that a program in accordance with this flowchart is stored in the ROM 2.

When power is introduced to the apparatus, each element of the apparatus is initialized at step S11 to enable operation. Next, the program proceeds to step S12, at which the data preserved on the hard disk device 11 are read out and loaded in the registration area 3a of RAM 3. A key input from the control panel 4 is awaited at step S13. When the key input is detected, the program proceeds to step S14, at which it is determined whether the pressed key is the data save key 4b. If it is determined that the pressed key is the data save key 4b, then the program proceeds to step S15, at which all of the data registered in the registration area 3a of the RAM 3 is preserved on the hard disk device 11. The program then returns to step S13.

If it is determined that the pressed key is other than the data save key 4b, the program proceeds to step S16, at which processing (e.g., processing for data transmission) corresponding to the pressed key is executed.

In the second embodiment described above, data reception and print-out are performed by interrupt processing when an incoming call arrives, just as in the first embodiment.

Also, when the telephone number of another party is to be registered anew in the second embodiment, it can be so arranged that merely performing an ordinary registration operation adds the registered data to the hard disk device 11 automatically to thus preserve the data. Such an arrangement is advantageous in that the preservation processing can be executed without the user being aware of the fact that the data are being preserved on the hard disk device 11.

In accordance with the second embodiment described above, registered data such as the telephone numbers of other parties are preserved on the hard disk device 11, and these data are loaded in the RAM when power is introduced. In case of a power failure, or if a power supply switch is turned off in order to move the apparatus to another location, ordinary operation can be resumed, without user anxiety, merely by turning on the power supply switch again (or restoring power after the power failure).

In both the first and second embodiments, it is unnecessary to use the conventionally employed low-power consumption-type SRAM, which has a high unit price per bit, and a battery for backing up the SRAM. In a case where a large quantity of original-image information is transmitted, the transmission is made after the information is stored on the hard disk. As a result, it is no longer necessary to use a large quantity of costly IC memories, as is required in the prior art. This makes it possible to provide a communication apparatus exhibiting excellent cost performance. In actuality, when an image is transmitted, it suffices to execute processing in which the entirety of the original image is preserved on the hard disk via the reader 7, and the data is successively read in from the image memory 10 and transmitted following connection to a line.

In the second embodiment, it is of course permissible to add the function of the data load key 4a in order that the registered data may be read in from the hard disk device 11 in response to a designation made by the operator.

Though a facsimile machine is taken as an example in the first and second embodiments, this does not impose a restriction since the present invention can be applied to any apparatus which communicates with the terminal of another party via a line.

Further, by way of example, the arrangement is such that the hard disk device 11 of the foregoing embodiments is capable of being attached to and detached from the body of the apparatus with ease. Therefore, even if a situation arises in which the apparatus is sent out for repairs, the detached hard disk device 11 can be attached to another apparatus of the same type, thereby making it possible to resume operation without any impediment.

As many apparently widely different embodiments of the present invention can be made without departing from the spirit and scope thereof, it is to be understood that the invention is not limited to the specific embodiments thereof except as defined in the appended claims.

What is claimed is:

1. A communication apparatus comprising:
   a rewritable volatile memory for storing a plurality of addresses;
   manual selecting means for manually selecting one of the addresses stored in said volatile memory;
   transmitting means for transmitting data to the selected address;
   a non-volatile storage device for storing the data to be transmitted by said transmitting means;
   preserving means for preserving the plurality of addresses and the data which have been stored with a predetermined file name to be distinguishable from other data stored therein; and reading means for reading the plurality of addresses, which has been preserved by said preserving means, out of said non-volatile storage device and storing the plurality of addresses into said volatile memory.

2. The apparatus according to claim 1, wherein said manual selecting means comprises single-touch keys.

3. The apparatus according to claim 1, wherein said volatile memory stores destination name information corresponding to a respective address of the plurality of addresses.

4. The apparatus according to claim 1, wherein said preserving means and said reading means are actuated in response to a predetermined manual operation.

5. The apparatus according to claim 1, further comprising registering means for registering a new address in said volatile memory, wherein after the new address is registered in said volatile memory, said preserving means automatically preserves the new address in said non-volatile storage device.

6. The apparatus according to claim 1, wherein said reading means is automatically actuated in response to power being supplied to said communication apparatus.

7. The apparatus according to claim 1, wherein said non-volatile storage device comprises a hard disk device.

8. The apparatus according to claim 7, wherein said hard disk device is freely attachable to and detachable from said communication apparatus.

9. The apparatus according to claim 1, wherein said communication apparatus is a facsimile apparatus.

10. The apparatus according to claim 1, wherein said data comprises image data.

11. A communication apparatus comprising:
a rewritable volatile memory for storing a plurality of addresses;
manual selecting means for manually selecting one of the addresses stored in said volatile memory;
transmitting means for transmitting data to the selected address;
a non-volatile storage device for storing the data to be transmitted by said transmitting means;
preserving means for preserving the plurality of addresses and the data which have been stored in said volatile memory, in said non-volatile storage device, said preserving means preserving the plurality of information in a predetermined field of said non-volatile storage device to be distinguishable from other data stored therein; and
reading means for reading the plurality of addresses, which has been preserved by said preserving means, out of said non-volatile storage device and storing the plurality of addresses into said volatile memory.

12. The apparatus according to claim 11, wherein said manual selecting means comprises single-touch keys.

13. The apparatus according to claim 11, wherein said volatile memory stores destination name information corresponding to a respective address of the plurality of addresses.

14. The apparatus according to claim 11, wherein said preserving means and said reading means are actuated in response to a predetermined manual operation.

15. The apparatus according to claim 11, further comprising registering means for registering a new address in said volatile memory, wherein after the new address is registered in said volatile memory, said preserving means automatically preserves the new address in said non-volatile storage device.

16. The apparatus according to claim 11, wherein said reading means is automatically actuated in response to power being supplied to said communication apparatus.

17. The apparatus according to claim 11, wherein said non-volatile storage device comprises a hard disk device.

18. The apparatus according to claim 17, wherein said hard disk device is freely attachable to and detachable from said communication apparatus.

19. The apparatus according to claim 11, wherein said communication apparatus comprises a facsimile apparatus.

20. The apparatus according to claim 11, wherein said data is image data.

21. A communication apparatus comprising:
a rewritable volatile memory for storing a plurality of addresses;
manual selecting means for manually selecting one of the addresses stored in said volatile memory;
transmitting means for transmitting data to the selected address;
a non-volatile storage device for storing the data to be transmitted by said transmitting means;
preserving means for preserving the plurality of addresses and the data which have been stored in said volatile memory, in said non-volatile storage device; and
reading means for reading the plurality of addresses as a whole, which has been preserved by said preserving means, out of said non-volatile storage device and storing the plurality of addresses in said volatile memory,
wherein said reading means is automatically actuated in response to power to said communication apparatus being turned on.

22. The apparatus according to claim 21, wherein said manual selecting means comprises single-touch keys.

23. The apparatus according to claim 21, wherein said volatile memory stores destination name information corresponding to a respective address of the plurality of addresses.

24. The apparatus according to claim 21, wherein said preserving means preserves the plurality of addresses in said non-volatile storage device in response to a predetermined manual operation.

25. The apparatus according to claim 21, further comprising registering means for registering a new address in said volatile memory, wherein after the new address is registered in said volatile memory, said preserving means automatically preserves the new address in said non-volatile storage device.

26. The apparatus according to claim 21, wherein said non-volatile storage device comprises a hard disk device.

27. The apparatus according to claim 26, wherein said hard disk device is freely attachable to and detachable from said communication apparatus.

28. The apparatus according to claim 21, wherein said communication apparatus comprises a facsimile apparatus.

29. The apparatus according to claim 21, wherein said data comprises image data.

30. A communication apparatus comprising:
a rewritable volatile memory for storing a plurality of addresses;
manual selecting means for manually selecting one of the addresses stored in said volatile memory;
transmitting means for transmitting data to the selected address;
a non-volatile storage device for storing the plurality of addresses;

inputting means for inputting a new address into said volatile memory;

preserving means for preserving the inputted address to said non-volatile storage device when the new address is inputted by said inputting means; and reading means for reading the plurality of addresses preserved in said non-volatile storage device, and storing the plurality of addresses in said volatile memory.

31. The apparatus according to claim 30, wherein said manual selecting means comprises single-touch keys.

32. The apparatus according to claim 30, wherein said volatile memory stores destination name information corresponding to respective speed dial numbers.

33. The apparatus according to claim 30, wherein said preserving means preserves the plurality of addresses in the non-volatile storage device in response to a predetermined manual operation.

34. The apparatus according to claim 30, wherein said non-volatile storage device comprises a hard disk device.

35. The apparatus according to claim 34, wherein said hard disk device is freely attachable to and detachable from said communication apparatus.

36. The apparatus according to claim 30, wherein said communication apparatus comprises a facsimile apparatus.

37. The apparatus according to claim 30, wherein said data comprises image data.

38. The apparatus according to claim 30, wherein said reading means reads the plurality of addresses as a whole, and stores the plurality of addresses in said volatile memory.

39. The apparatus according to claim 30, wherein said reading means reads the plurality of addresses in response to a predetermined manual operation, and stores the plurality of addresses in said volatile memory.

40. The apparatus according to claim 30, wherein said reading means reads the plurality of addresses in response to power to said communication apparatus being turned on, and stores the plurality of addresses in said volatile memory.

41. A method of communicating, comprising the steps of:

storing a plurality of addresses in a rewritable volatile memory;

manually selecting one of the addresses stored in the volatile memory;

transmitting data to the selected address;

storing the data to be transmitted in said transmitting step in a non-volatile storage device;

preserving the plurality of addresses and the data which have been stored with a predetermined file name to be distinguishable from other data stored therein; and reading the plurality of addresses which has been preserved out of the non-volatile storage device and storing the plurality of addresses into the volatile memory.

42. The method according to claim 41, wherein the manual selecting step uses single-touch keys.

43. The method according to claim 41, wherein destination name information corresponding to a respective address of the plurality of addresses is stored in the volatile memory.

44. The method according to claim 41, wherein said preserving step and said reading step are actuated in response to a predetermined manual operation.

45. The method according to claim 41, further comprising the step of registering a new address in the volatile memory, wherein after the new address is registered in the volatile memory, said preserving step automatically preserves the new address in the non-volatile storage device.

46. The method according to claim 41, wherein the data comprises image data.

47. A method of communicating, comprising the steps of:

storing a plurality of addresses in a rewritable volatile memory;

manually selecting one of the addresses stored in the volatile memory;

transmitting data to the selected address;

storing the data to be transmitted in said transmitting step in a non-volatile storage device;

preserving the plurality of addresses and the data which have been stored in the volatile memory, in the non-volatile storage device, said preserving step preserving the plurality of information in a predetermined field of the non-volatile storage device to be distinguishable from other data stored therein; and reading the plurality of addresses, which has been preserved in said preserving step, out of the non-volatile storage device and storing the plurality of addresses into the volatile memory.

48. The method according to claim 47, wherein said manual selecting step uses single-touch keys.

49. The method according to claim 47, wherein destination name information corresponding to a respective address of the plurality of addresses is stored in the volatile memory.

50. The method according to claim 47, wherein said preserving step and said reading step are actuated in response to a predetermined manual operation.

51. The method according to claim 47, further comprising a registering step for registering a new address in the volatile memory, wherein after the new address is registered in the volatile memory, the new address is automatically preserved in the non-volatile storage device.

52. The method according to claim 47, wherein the data is image data.

53. A method of communicating, comprising the steps of:

storing a plurality of addresses in a rewritable volatile memory;

manually selecting one of the addresses stored in the volatile memory;

transmitting data to the selected address;

storing the data to be transmitted in said transmitting step in a non-volatile storage device;

preserving the plurality of addresses and the data which have been stored in the volatile memory, in the non-volatile storage device; and reading the plurality of addresses as a whole, which has been preserved in said preserving step, out of the non-volatile storage device and storing the plurality of addresses in the volatile memory, wherein said reading step is automatically actuated in response to power being turned on.

54. The method according to claim 53, wherein said manual selecting step uses single-touch keys.

55. The method according to claim 53, wherein destination name information corresponding to a respective address of the plurality of addresses is stored in the volatile memory.

56. The method according to claim 53, wherein said preserving step preserves the plurality of addresses in the non-volatile storage device in response to a predetermined manual operation.

57. The method according to claim 53, further comprising the step of registering a new address in the volatile memory, wherein after the new address is registered in the volatile memory, the new address is automatically preserved in the non-volatile storage device.

58. The method according to claim 53, wherein the data comprises image data.

59. A method of communicating, comprising the steps of:

storing a plurality of addresses into a rewritable volatile memory;

manually selecting one of the addresses stored in the volatile memory;

transmitting data to the selected address;

storing the plurality of addresses in a non-volatile storage device;

inputting a new address into the volatile memory;

preserving the inputted address to the non-volatile storage device when the new address is inputted in said inputting step; and reading the plurality of addresses preserved in the non-volatile storage device, and storing the plurality of addresses in the volatile memory.

60. The method according to claim 59, wherein said manual selecting step uses single-touch keys.

61. The method according to claim 59, wherein destination name information corresponding to respective speed dial numbers is stored in the volatile memory.

62. The method according to claim 59, wherein said preserving step preserves the plurality of addresses in the non-volatile storage device in response to a predetermined manual operation.

63. The method according to claim 59, wherein the data comprises image data.

64. The method according to claim 59, wherein said reading step further comprises reading the plurality of addresses as a whole, and storing the plurality of addresses in the volatile memory.

65. The method according to claim 59, wherein said reading step further comprises reading the plurality of addresses in response to a predetermined manual operation, and storing the plurality of addresses in the volatile memory.

66. The method according to claim 59, wherein said reading step further comprises reading the plurality of addresses in response to power being turned on, and storing the plurality of addresses in the volatile memory.

* * * * *